(12) United States Patent
Blake, III

(10) Patent No.: US 7,914,054 B2
(45) Date of Patent: Mar. 29, 2011

(54) VEHICLE LATCH AND METHOD OF MANUFACTURING THE SAME

(75) Inventor: Thomas E. Blake, III, South Lyon, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 1078 days.

(21) Appl. No.: 10/909,827

(22) Filed: Aug. 2, 2004

(65) Prior Publication Data

US 2006/0033344 A1 Feb. 16, 2006

(51) Int. Cl.
*E05C 1/12* (2006.01)
*E05C 1/00* (2006.01)

(52) U.S. Cl. .................................. 292/173; 292/DIG. 38

(58) Field of Classification Search .................. 292/173, 292/DIG. 38
See application file for complete search history.

(56) References Cited

U.S. PATENT DOCUMENTS

| | | | |
|---|---|---|---|
| 5,121,952 A | | 6/1992 | Jason |
| 5,292,159 A | * | 3/1994 | Sandhu et al. ................ 292/173 |
| 5,482,333 A | | 1/1996 | Gehrs et al. |
| 5,484,178 A | * | 1/1996 | Sandhu et al. ................ 292/173 |
| 5,568,952 A | * | 10/1996 | Ruegg ............................ 292/318 |
| 6,109,669 A | * | 8/2000 | Pinkow .......................... 292/175 |
| 6,152,501 A | * | 11/2000 | Magi et al. ................ 292/336.3 |
| 6,502,871 B1 | | 1/2003 | Malmanger |
| 6,981,725 B2 | * | 1/2006 | Debrody et al. .......... 292/307 R |

FOREIGN PATENT DOCUMENTS

| | | |
|---|---|---|
| EP | 0331832 | 9/1989 |
| EP | 0940241 | 9/1999 |
| WO | 9830774 | 7/1998 |
| WO | 0022267 | 4/2000 |
| WO | 0061900 | 10/2000 |

* cited by examiner

*Primary Examiner* — Carlos Lugo
(74) *Attorney, Agent, or Firm* — Tarolli, Sundheim, Convell & Tummino LLP

(57) ABSTRACT

A releasable latch has a latched condition latching two parts together of an unlatched condition releasing one part for movement relative to another part. A base (20) is fixed to one of the parts and a catch (22) is supported by the base (20) and movable relative to the base to latch and unlatch the parts. A spring (72) biases the catch (22) to a position latching the parts together. A method of making the latch (10) includes the steps of molding the base (20) of the latch (10) of a first plastic material, molding a handle (24) to the base (20) to form an assembled unit of a second plastic material, molding the catch (22) to the molded base (20) and handle (24) to form a molded assembly in a mold of the handle (24), base (20) and catch (22), of a third plastic material.

6 Claims, 5 Drawing Sheets

VEHICLE LATCH AND METHOD OF MANUFACTURING THE SAME

TECHNICAL FIELD

The present invention is directed to a vehicle latch and method of manufacturing the same.

BACKGROUND OF THE INVENTION

A known type of vehicle cargo hold latch comprises a base, a handle, and a catch, all made of plastic, as well as a spring made of metal. The spring biases the catch to secure the cargo hold cover to the vehicle. The latch comprises four separately manufactured components which are assembled together.

SUMMARY OF THE INVENTION

The present invention is directed to a method of forming a releasable latch. The releasable latch has a latched condition latching two parts together and an unlatched condition releasing one part for movement relative to another part. During the method, a base of the latch is molded of a first plastic material and a handle is molded to the base to form an assembled unit of a second plastic material different than the first plastic material. Also during the method, a catch is molded to the molded base and handle to form a molded assembly in a mold of the handle, base and catch, of a third plastic material different than the first plastic material and different than the second plastic material.

According to one aspect of the invention, during the method, a spring is molded of the third plastic material to form a one-piece unit with the catch.

The present invention is also directed to a releasable latch having a latched condition latching two parts together and an unlatched condition releasing one part for movement relative to another part. The releasable latch includes a base molded of a first plastic material and a handle supported by the base and being movable relative to the base to latch and unlatch the parts. The handle is molded of a second plastic material different than the first plastic material. A catch is supported by the base and handle to form a molded assembly. The catch is movable to an unlatched condition relative to the parts and the base by movement of the handle. The catch is molded of a third plastic material different than the first plastic material and different than the second plastic material.

The present invention is also directed to a releasable latch having a latched condition latching two parts together and an unlatched condition releasing one part for movement relative to another part. The releasable latch comprises a base, a catch, a handle and a spring. The latch is fixed to one of the parts, and the catch is supported by the base and movable relative to the base to latch and unlatch the parts. The handle is supported by the base and movable relative to the base to cause the catch to unlatch the parts. The spring biases the catch to a position latching the parts together. The spring and the catch are a one piece plastic part and not separate pieces assembled or secured together.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
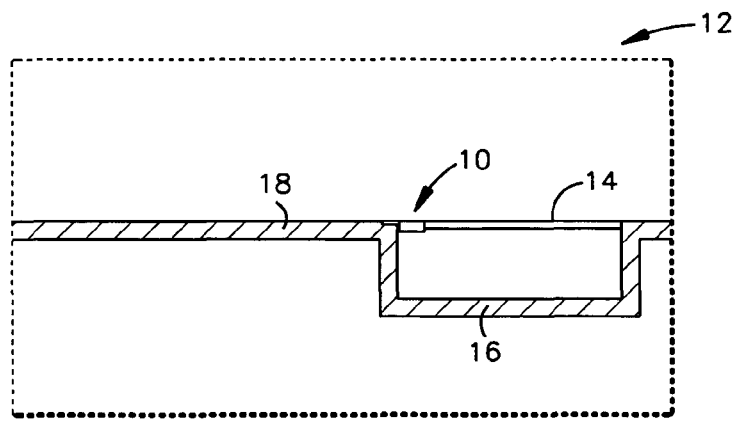
FIG. 1 is a schematic side view of a portion of the vehicle including a releasable latch constructed in accordance with the present invention.

FIG. 1 is a schematic side view of a portion of a vehicle 12 with a releasable latch 10 constructed in accordance with the present invention. For exemplary purposes, the releasable latch 10 illustrated in FIG. 1 is located in association with a cover 14 of a cargo hold 16 in the vehicle 12, however, the latch 10 may be associated with other latchable structures (not shown) in the vehicle.

The cargo hold 16 is a recessed compartment located in the vehicle floor 18 in the rear area of a vehicle, such as in a Sport Utility Vehicle (SUV). The cover 14 overlies the cargo hold 16. The releasable latch 10 has a latched condition latching the cover 14 and the vehicle floor 18 together, and an unlatched condition releasing the cover for movement relative to the vehicle floor.

Figure 2:
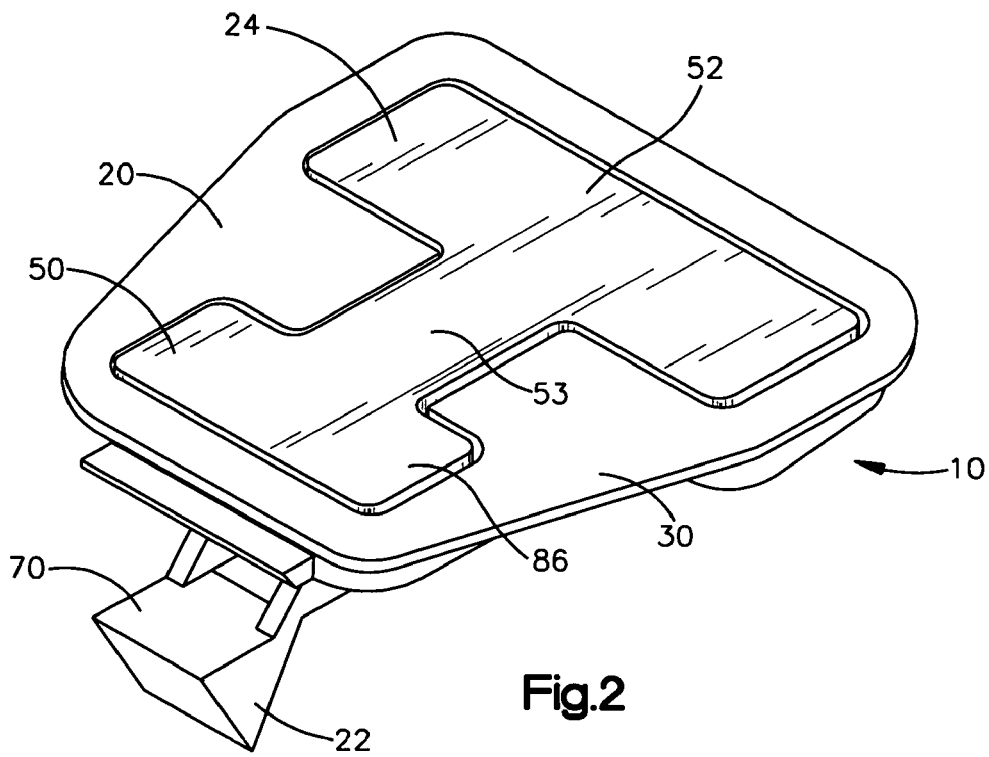
FIG. 2 is a schematic perspective plan view of the releasable latch embodying the present invention, in an assembled condition.
Figure 3:
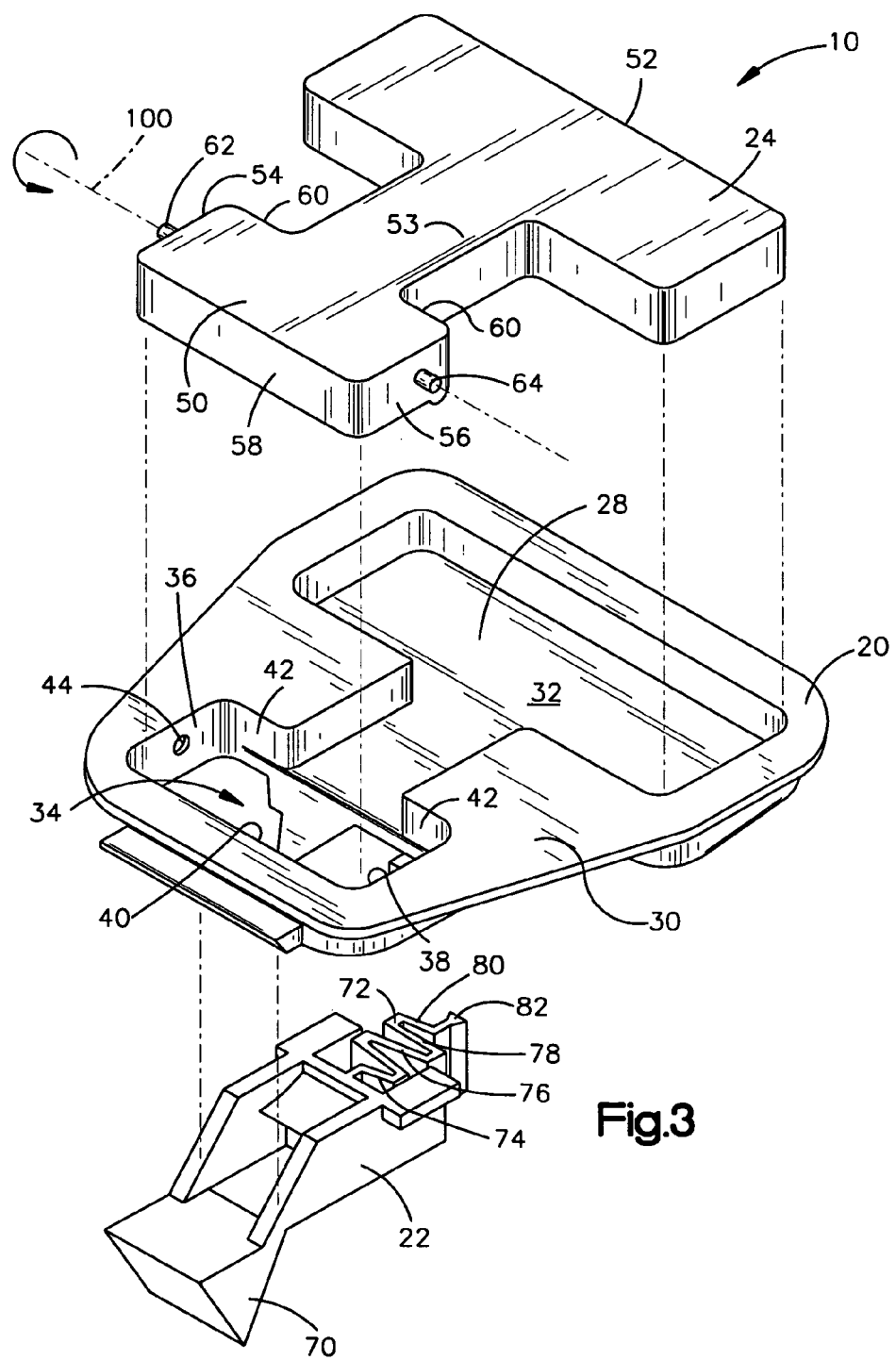
FIG. 3 is an exploded view of the latch of FIG. 2.

FIG. 2 illustrates a perspective view of an exemplary embodiment of a releasable latch 10 constructed in accordance with the present invention. An exploded perspective view of the releasable latch 10 is shown in FIG. 3. The releasable latch includes a base 20, a catch 22, and handle 24. The base 20, catch 22 and handle 24 are all made of plastic and are molded into an assembled unit by an in-mold assembly process which will be discussed in further detail below.

A top view of the base 20 of the releasable latch 10 embodying the present invention is shown in FIG. 3. The base 20 has a generally trapezoidal shape with a central portion 28 and a peripheral edge 30. The central portion 28 of the base 20 has a recessed area 32 and a generally rectangular shaped aperture 34. The rectangular shaped aperture 34 of the base 20 is defined by four wall segments 36, 38, 40, 42 including two shorter opposite wall segments 36, 38 and two longer opposite wall segments 40, 42. The two shorter wall segments 36, 38 have coaxial through holes 44, 46.

Figure 4:
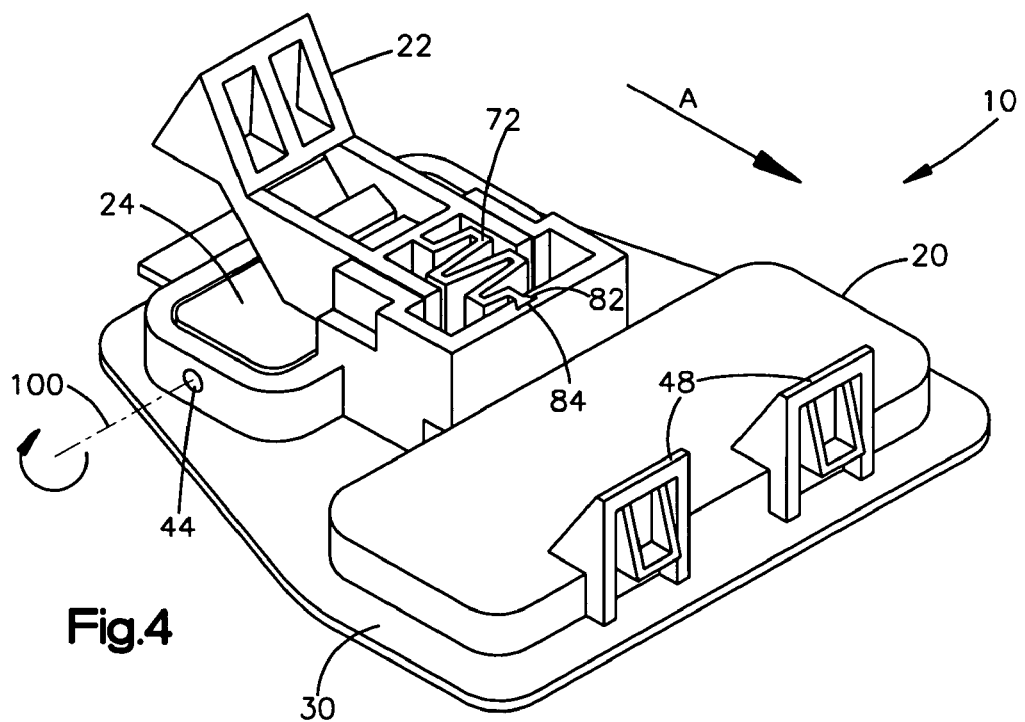
FIG. 4 is a schematic perspective view of the underside of the latch embodying the present invention, in an assembled condition.
Figure 5:
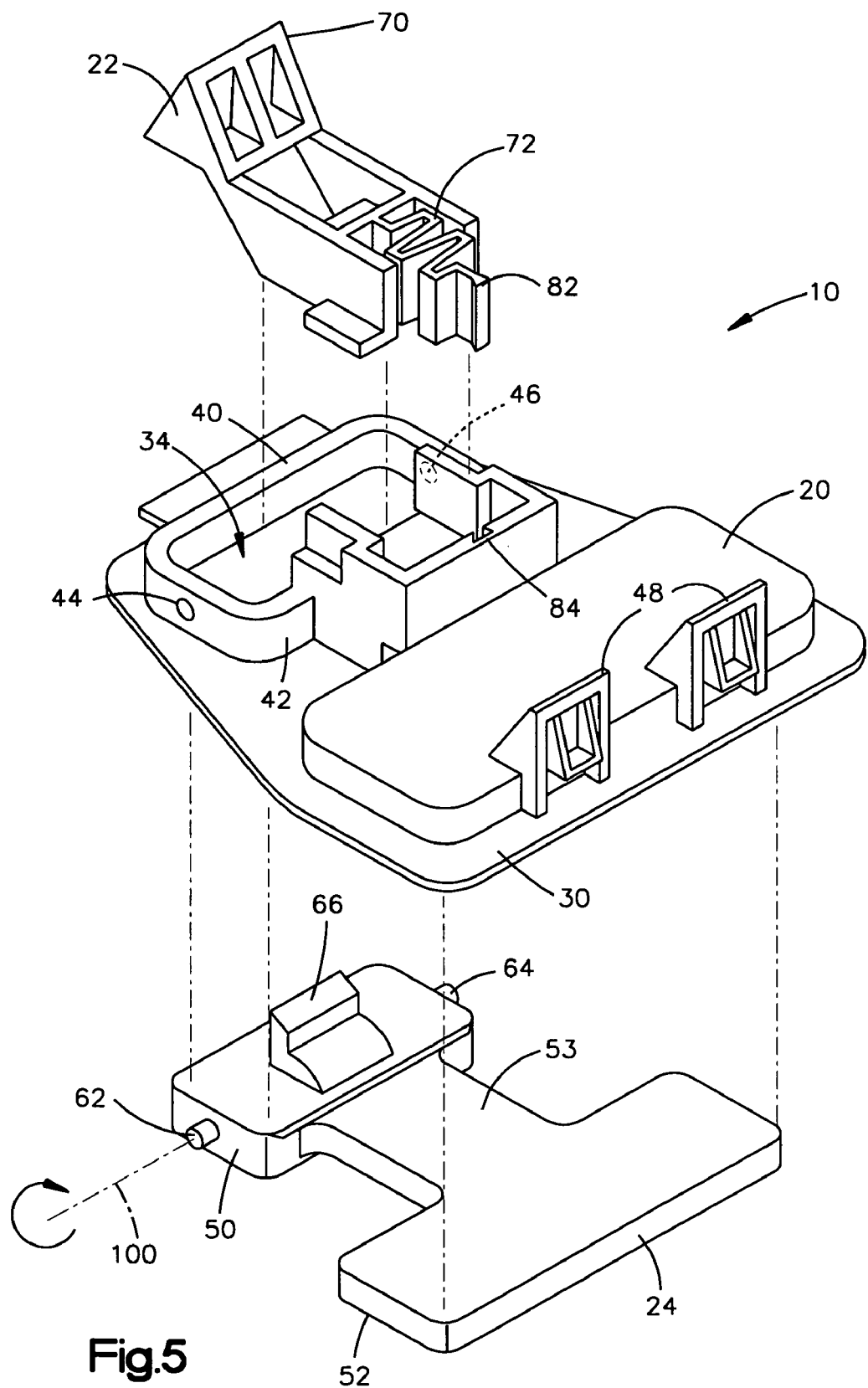
FIG. 5 is an exploded view of the latch of FIG. 4.

FIG. 4 illustrates a different perspective view of the releasable latch 10 embodying the present invention. An exploded perspective view of the underside of the latch 10 is shown in FIG. 5. The releasable latch 10 includes mounting tabs 48 for mounting the latch to the cover for installation in the vehicle 12.

As shown in FIG. 2, the handle 24 has two spaced apart first and second rectangular shaped portions 50, 52 which are connected together by an elongated connecting portion 53. The first rectangular shaped portion 50 is smaller than the second rectangular shaped portion 52. The first rectangular shaped portion 50 is sized to fit into the rectangular shaped aperture 34 of the base 20. The first rectangular shaped portion 50 of the handle 24 includes two shorter opposite wall segments 54, 56 and two longer opposite wall segments 58, 60.

As viewed in FIGS. 3 and 5, the two shorter opposite wall segments 54, 56 of the first rectangular shaped portion 50 have coaxial shafts 62, 64 which define an axis of rotation 100. The coaxial shafts 62, 64 extend through the coaxial through holes 44, 46 in the base 20 when molded together to form a molded connection. The handle 24 is rotatable relative to the base 20 about the axis of rotation 100.

When the handle 24 is molded as one unit with the base 20, the second rectangular shaped portion 52 of the handle 24 is seated in the recessed area 32 of the base 20. In addition, the underside of the first rectangular shaped portion 50 of the handle 24 includes a member 66 for helping to move the catch 22 when the latch is moved from the latched condition to the unlatched condition as discussed further below.

As shown in FIGS. 4 and 5, the catch 22 is located on the underside of the base 20. The catch 22 has a wedge shaped portion 70 which protrudes beyond the peripheral edge 30 of the base 20 on the underside of the base 20 as shown in FIG. 2. The wedge shaped portion 70 is located underneath the surrounding vehicle floor 18 when the cover 14 is in a latched condition to block movement of the cover 14 relative to the vehicle floor 18 when the latch is in the latched condition.

As shown in FIGS. 3, 4 and 5, a spring 72 is preferably molded as one-piece with the catch 22. The spring 72 is preferably also made from the same plastic material as the catch 22 so that the spring 72 and the catch 22 are preferably one continuous structure and not two separate structures that are secured or assembled together.

The spring 72 has four coils 74, 76, 78, 80. The spring 72 preferably includes a dove-tail shaped counterpart 82 and is molded into a dove-tail shaped cavity 84 on the base 20 to form a molded connection between the catch 22 and the base 20 (FIG. 4). However, the counterpart 82 and the cavity 84 can have any other shape.

The spring 72 supplies a biasing force onto the wedge shaped portion 70 of the catch 22 which biases the wedge shaped portion into the latched condition. The spring force necessary for the spring 72 to bias the latch 10 in the latched condition is approximately 1 Newton per millimeter.

Although the spring 72 has four coils, it should be understood that the number of coils can increase or decrease in order to achieve a desired spring rate. In addition, the necessary spring force can be achieved by manipulation of a number of other factors including coil thickness, coil length, coil width, free length, space between coils, coil angle, fillet/radii side, and material selection. Thus, if a higher spring force is needed, any number of factors can be manipulated to achieve the desired spring force of the spring 72.

To release the cover 14 from the vehicle floor, the edge 86 of the first rectangular shaped portion 50 on the handle 24 is depressed to cause the second rectangular shaped portion 52 of the handle 24 to lift slightly out of the recessed area 32 in the base 20 in the manner of a lever. The second rectangular shaped portion 52 of the handle 24 is then able to be rotated about the axis 100 relative to the base 20.

The portion 66 of the handle 24 moves the catch 22 against the force of the spring 72 to compress the coils 74, 76, 78, 80 of the spring. The wedge shaped portion 70 of the catch 22 is moved along directional arrow A to unblock movement of the cover relative to the vehicle floor 18 and to move the latch 10 to the unlatched condition. Once latch 10 is moved to the unlatched condition, the cover 14 can be released to access the cargo hold 16 of the vehicle 12.

The plastic materials used to form the base, handle 24 and catch 22 are dissimilar from each other. The base 20 is made of a thermoplastic material such as Nylon PA66.

The handle 24 is formed from a thermoplastic material different than the thermoplastic material used for forming the base 20. The handle 24 is made of a thermoplastic material such as polypropylene. Polypropylene and Nylon PA66 are dissimilar thermoplastic materials in that they have different properties making them difficult to bond to one another. However, if desired, the plastic materials can be made to bond to one another with the use of a separate adhesive or by applying a surface treatment to activate the plastic surface such as an etch.

The catch 22 is formed from a thermoplastic material different than the thermoplastic material used for forming the base 20 and the handle 24. The catch 22 is made of a thermoplastic material such as POM, (polyoxymethylene) or Acetal.

Instead of the handle 24 being made from polypropylene, the handle 24 can be made from another suitable thermoplastic material. Other suitable thermoplastic materials for the handle 24 include but are not limited to PA6 (nylon 6), PA66, PBT (Polybutylene Terephthalate), and ABS (Acrylonitrile Butadiene Styrene) or a blend thereof.

Instead of the base 20 being made from PA66, the base 20 can be made from another suitable thermoplastic material. Other suitable thermoplastic materials for the base 20 include but are not limited to PA6 (nylon 6), PBT (Polybutylene Terephthalate) and polypropylene or a blend thereof. The thermoplastic material of the base 20, however, cannot be the same thermoplastic material as the handle 24 when molding the latch 10.

As described below in detail, POM, PA66 and polypropylene are dissimilar plastic materials in that they have different properties making them difficult to bond to one another. Instead of the catch 22 being made from POM, the catch 22 can be made from another suitable thermoplastic material. Other suitable thermoplastic materials include but are not limited to polyphenylene sulfide (PPS), nylon 66, nylon 6, polycarbonate, polypropylene, ABS (Acrylonitrile Butadiene Styrene) or a blend of polycarbonate and ABS. The thermoplastic material of the catch 22, however, cannot be the same thermoplastic material as the handle 24 or the base 20 when molding the latch 10.

If desired, the thermoplastic material selected from the group of thermoplastic materials used to form the base 20 can be wholly interchanged with any one of the group of thermoplastic materials used to form the handle 24.

Figure 6:
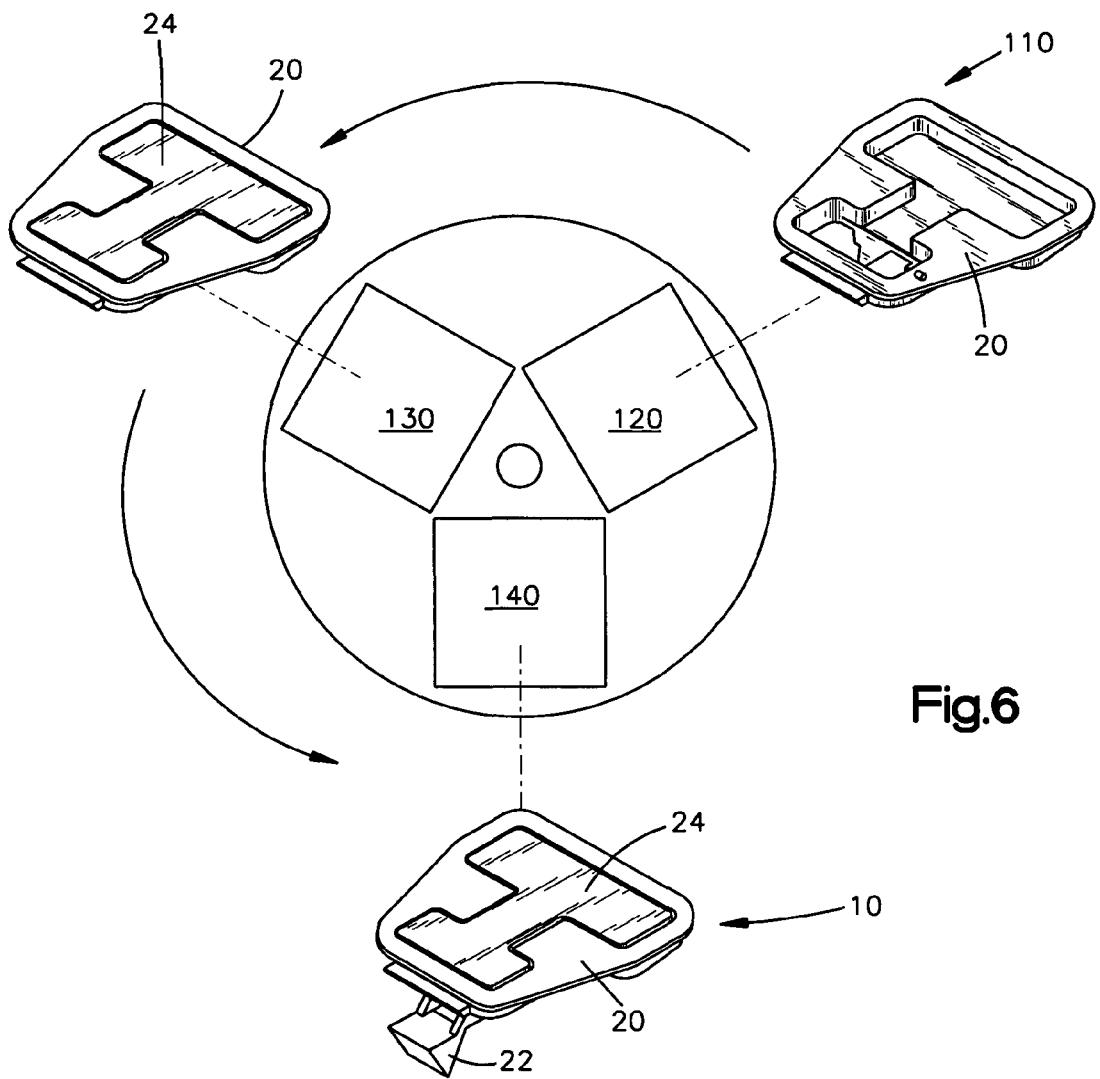
FIG. 6 is a schematic view of the method of molding the releasable latch embodying the present invention.

FIG. 6 is a schematic view of the method of molding the latch 10 embodying the present invention. The base 20, handle 24 and the catch 22 are formed as one assembled unit during an in-mold assembly process 110 known as multi-shot injection mold technology. The base 20, the catch 22 and the handle 24 of the latch 10 are molded into a single structure by this process 110.

The assembled unit of the base 20, the catch 22 and the handle 24 formed by the in-mold assembly process 110 eliminates the need for subsequent assembly of the base 20, handle 24 and catch 22 after molding takes place. In addition, the assembled unit of the base 20, the catch 22, and the handle 24 formed by the in-mold assembly process 110 eliminates the need for separate fasteners or screws or any other separate fastening means to connect the base, catch and handle after molding takes place and thereby also eliminates the labor for fastening the separate fasteners to connect the base, catch and handle.

With respect to the exemplary embodiment of the latch 10 shown in FIGS. 1-5, the base 20 is molded first, the handle 24 is molded second and the catch 22 is molded third.

The in-mold assembly process 110 (FIG. 6) has a first injection station (not shown) for injecting the first plastic material into a first mold cavity 120 defining the base 20. After the base 20 is molded, the base 20 is removed from the first mold cavity 120 and inserted into a second mold cavity 130.

The molded base 20 defines part of the mold for subsequently molding the handle 24. The second mold cavity 130 as well as the base 20 together define the mold for the handle 24 for molding the handle as one unit with the base.

The in-mold assembly process 110 has a second injection station (not shown) for injecting the second thermoplastic material into the second mold cavity 130 to mold the handle 24 as one unit with the base 20. The melting point of the plastic material used to mold the base 20 is higher than the melting point of the plastic material used to mold the handle 24. As a result, the base 20 does not melt during the molding of the handle 24. Because the melting point of the plastic material used to form the base 20 is higher than the melting point of the plastic material used to form the handle 24, the base 20 can function as part of the mold used to form the handle.

Plastic materials have inherent shrinkage rates which can be used to calculate the amount of shrinkage of a molded part as the plastic cools. During the injection molding process 110, the plastic material of the base 20 is injection molded first to form the first and second coaxial through holes 44, 46 which are predefined by a geometry in the first mold cavity 120. The annular surface of the base 20 defining the first and second through holes 44, 46 also provide a boundary onto which the plastic material of the handle 24 is subsequently injected in the second injection station to form the first and second coaxial shafts 62, 64.

The first and second shafts 62, 64 define an axis of rotation. As it cools, the plastic material of the handle 24 at the location of the first and second coaxial shafts 62, 64, shrinks away from the annular surface of the base 20 defining the through holes 44, 46 leaving a clearance area (not shown) around the annular surface between the handle 24 and the base 20. The clearance area allows the handle 24 to rotate about the axis of rotation relative to the base 20. A molded connection results between the handle 24 and the base 20 at the location of the first and second coaxial through holes 44, 46 of the base 20 and the second coaxial shafts 62, 64 of the handle 24.

Since the plastic materials used to mold the base 20 and the handle 24 have dissimilar properties, the plastic material of the handle 24 does not adhere to or bond with the plastic material of the base 20 during the molding process 110.

The molded handle 24 and base 20 is removed from the second mold cavity 130 and inserted into a third mold cavity 140. The third mold cavity 140 as well as the one-piece handle 24 and base 20 together define the mold for the catch 22 for molding the catch 22 as one unit with the one-piece handle 24 and base 20 into a single assembled structure.

The in-mold assembly process 110 has a third injection station (not shown) for injecting the third thermoplastic material into the third mold cavity 140 to mold the catch 22 as one unit with the one-piece molded handle 24 and base 20. As the catch 22 is molded, the spring 72 is preferably molded as one unit with the catch 22 and preferably from the same thermoplastic material used to form the catch 22 so that, preferably, a one-piece structure consisting of a catch 22 and spring 72 is formed in the third mold cavity 140.

The melting point of the plastic material used to mold the handle 24 and base 20 is higher than the melting point of the plastic material used to mold the catch 22. As a result, the molded handle 24 and base 20 does not melt during the molding of the catch 22.

During molding of the base 20, a dove-tail shaped cavity 84 is formed which is predefined by a geometry in the first mold cavity 120. The dove-tail shaped counterpart 82 on the spring 72 is molded into the dove-tail shaped cavity 84 on the base 20. The surface defining the dove-tail shaped cavity 84 of the base 20 defines a boundary onto which the plastic material of the catch is subsequently injected in the third injection station to form the dove-tail shaped counterpart 82 on the spring 72.

Because the melting point of the plastic material used to form the one-piece molded handle 24 and base 20 is higher than the melting point of the plastic material used to form the catch 22, the one-piece molded handle 24 and base 20 can function as part of the mold used to form the catch 22. The molded connection between the dove tail shaped cavity 84 and the dove tail shaped counterpart 82 results in a single assembled structure consisting of the base 20, the catch 22, and the handle 24.

After the catch 22 is molded in one-piece with the handle 24 and base 20, the finished latch 10 is a single molded assembly. The finished latch 10 is ejected from the third mold cavity 140. No further assembly is required before the latch 10 is mounted in the cover 14 of the cargo hold 16 in the vehicle 12.

During the in mold assembly process 110, the base 20 is transferred from the first mold cavity 120 to the second mold cavity 130 and the molded handle and base is transferred from the second mold cavity 130 to the third mold cavity 140 to form the molded handle 24, base 20 and catch 22 by a technique known in the art as rotary indexing. The transfer between the first, second and third mold cavities 120, 130, and 140 is schematically represented with arrows in FIG. 6. By using vertical injection units, a rotary table can be used to index the molds 120, 130, 140 through the first, second and third plastic material injection stations (not shown).

In the process 110 illustrated in FIG. 6, the table rotation is 120 degrees between each station. The mold cavities 120, 130, 140 lie on a horizontal plane. The mold cavities 120, 130, 140 themselves are rotated by a servo motor in the table to bring each intermediate stage of the latch 10 to the new cavity. Alternatively, each step may be performed in separate injection molding machines. In addition, other more complex in mold assembly processes 110 can be used to mold the latch 10.

Figure 7:
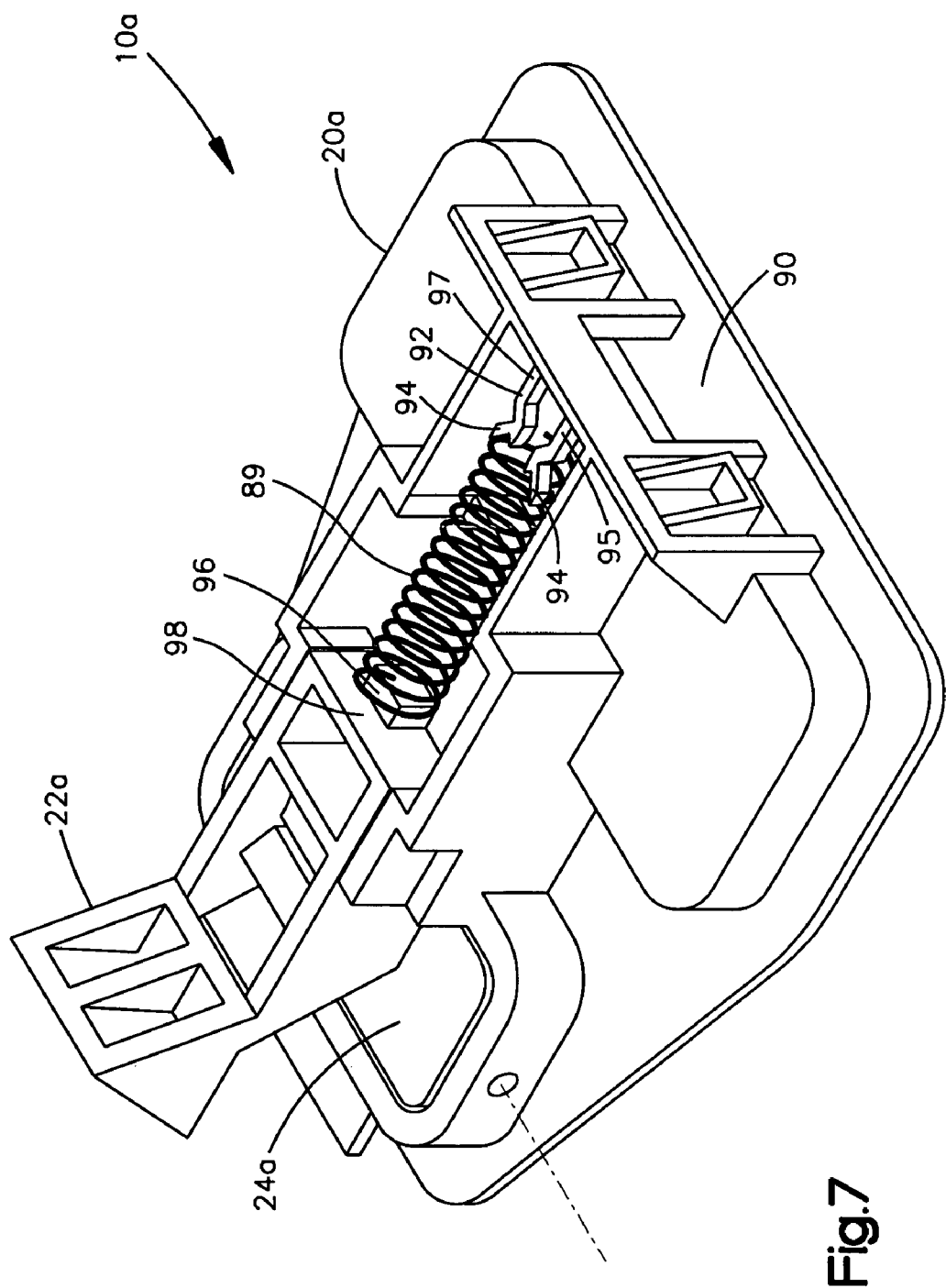
FIG. 7 illustrates a perspective bottom view of a releasable latch which is constructed in accordance with a second embodiment of the present invention.

FIG. 7 illustrates a perspective bottom view of a releasable latch 10a which is constructed in accordance with a second embodiment of the present invention. The releasable latch 10a is similar to the releasable latch 10 so that similar parts are given similar reference numbers with the suffix "a" added.

The releasable latch 10a includes a base 20a, a handle 24a and a catch 22a. The base 20a, catch 22a and handle 24a are all made of plastic and are molded into an assembled unit by the in-mold assembly process 110. The catch 22a does not include an integral plastic spring. Instead, a metal spring 89 is used in the latch 10a.

The base 20a includes structure for inserting and guiding the spring 89 into the latch 10a. The base 20a includes an aperture 90 for inserting the spring 89 and a deflectable portion 92. The deflectable portion 92 includes two prongs 95, 97 which are deflectable away from each other as the spring 89 is inserted into the aperture 90 and guided between the two prongs in the latch 10a. When the spring 89 is pushed past the deflectable portion 92, the two prongs 95, 97 return to their normal resting position and the terminal end of the spring is seated on the forked-end 94 of the two prongs and the other end of the spring is seated against a planar surface 98 of the catch 22a.

The catch 22a also includes a short guide 96 around which the spring 89 is guided to be seated against the surface 98 of the catch. The spring 89 is biased between the forked-end 94 of the deflectable portion 92 and the surface 98 of the catch 22a when it is assembled with the latch 10a.

The metal spring 89 can be assembled with the releasable latch 10a in a fourth station (not shown) of the injection molding process 110. In the fourth station, a robot preferably inserts the metal spring 89 into the aperture 90 of the base 20a and pushes the spring past the deflectable portion 92 to be seated on the forked-end 94 of the two prongs 95, 97 and the surface 98 of the catch 22a.

The metal spring 89 may alternatively be assembled with the releasable latch 10a in another manner. After the base 20a, the handle 24a and catch 22a have been injection molded in one piece, the one-piece part may be ejected from the mold. The metal spring 89 may be assembled with the one-piece part in a second assembly cell separate from the injection molding process 110 by either manual or robotic assembly means.

After the metal spring 89 is assembled with the one-piece part, the finished releasable latch 10a is a one-piece structure requiring no further assembly. The releasable latch 10a operates in the same manner as the releasable latch 10.

From the above description of the invention, those skilled in the art will perceive improvements, changes and modifications. Such improvements, changes and modifications within the skill of the art are intended to be covered by the appended claims.

Having described the invention, the following is claimed:

1. A releasable latch having a latched condition latching two parts together and an unlatched condition releasing the cover for movement relative to another part, said releasable latch comprising:

a base molded of a first plastic material;
a handle supported by said base and being movable relative to said base to latch and unlatch said parts, said handle being molded of a second plastic material different than said first plastic material;
a catch supported by said base and said handle to form a molded assembly, said catch being movable to the unlatched condition relative to said base by movement of said handle, said catch being molded of a third plastic material different than said first plastic material and different than said second plastic material,
said first plastic material, said second plastic material, and said third plastic material each having different and dissimilar properties such that said base, said handle, and said catch are unlikely to adhere to each other during the molding of said base, said handle, and said catch.

2. The releasable latch according to claim 1 further comprising a spring for biasing said catch to a latched condition, said spring being molded of said third plastic material.

3. The releasable latch according to claim 2 wherein the third plastic material has a lower melting point than the first and second plastic materials.

4. The releasable latch according to claim 2 wherein the first, second and third plastic materials have chemical properties which prevent the materials from adhering to each other or bonding to each other.

5. The releasable latch according to claim 1 wherein the second plastic material has a lower melting point than the first plastic material.

6. The releasable latch according to claim 1 further comprising a spring for biasing said catch to a latched condition, said spring being made of metal.

* * * * *